(12) United States Patent
Wei

(10) Patent No.: US 11,314,151 B2
(45) Date of Patent: *Apr. 26, 2022

(54) LENS MODULE

(71) Applicant: Raytech Optical (Changzhou) Co., Ltd., Changzhou (CN)

(72) Inventor: Chuandong Wei, Shenzhen (CN)

(73) Assignee: Raytech Optical (Changzhou) Co., Ltd., Changzhou (CN)

(*) Notice: Subject to any disclaimer, the term of this patent is extended or adjusted under 35 U.S.C. 154(b) by 57 days.

This patent is subject to a terminal disclaimer.

(21) Appl. No.: 16/805,702

(22) Filed: Feb. 29, 2020

(65) Prior Publication Data

US 2020/0201147 A1  Jun. 25, 2020

Related U.S. Application Data

(63) Continuation-in-part of application No. 15/416,121, filed on Jan. 26, 2017, now Pat. No. 10,606,020.

(30) Foreign Application Priority Data

Dec. 10, 2016 (CN) .......................... 201621353104.1
Dec. 10, 2016 (CN) .......................... 201621353141.2
Dec. 10, 2016 (CN) .......................... 201621353200.6

(51) Int. Cl.
*G03B 17/12* (2021.01)
*G02B 7/02* (2021.01)
*G02B 9/04* (2006.01)

(52) U.S. Cl.
CPC .............. *G03B 17/12* (2013.01); *G02B 7/021* (2013.01); *G02B 7/022* (2013.01); *G02B 7/025* (2013.01); *G02B 9/04* (2013.01)

(58) Field of Classification Search
CPC .......... G02B 9/04; G02B 7/021; G02B 7/022; G02B 7/025; G02B 7/02; G02B 7/00; G03B 17/12; G03B 17/00

(Continued)

(56) References Cited

U.S. PATENT DOCUMENTS 7,079,332 B2* 7/2006 Tanaka ................ G02B 7/021
 359/811
7,311,453 B2* 12/2007 Li .......................... G02B 7/021
 396/529

(Continued)

FOREIGN PATENT DOCUMENTS

JP  1979151253 B1  10/1979
JP  1980079304 B1  5/1980

(Continued)

OTHER PUBLICATIONS

1st Office Action dated Mar. 13, 2018 by JPO in related Japanese Patent Application No. 2017051914 (9 Pages).

*Primary Examiner* — William R Alexander
(74) *Attorney, Agent, or Firm* — W&G Law Group

(57) ABSTRACT

A lens module, including: a lens barrel, a first lens group having at least one lens and accommodated in the lens barrel, a spacer provided at an end of the lens barrel close to an image side, and a second lens group having at least one lens and accommodated in the spacer, the lens barrel includes a first barrel wall forming a light aperture, a second barrel wall bending and extending from the first barrel wall, the lens barrel further includes a first inner wall and a first outer wall corresponding to the first inner wall, the spacer includes a second inner wall and a second outer wall corresponding to the second inner wall, the lens barrel is fitted and fixed with the spacer. The lens module provided by the present disclosure can be assembled section by section, which is more convenient and makes the module structure more stable.

21 Claims, 16 Drawing Sheets

(58) Field of Classification Search
USPC .......................................................... 359/829
See application file for complete search history.

(56) References Cited

U.S. PATENT DOCUMENTS

| | | | | |
|---|---|---|---|---|
| 7,663,686 | B2* | 2/2010 | Chen .................... | H04N 5/2253 |
| | | | | 348/335 |
| 7,746,576 | B2* | 6/2010 | Lee ........................ | G02B 7/022 |
| | | | | 359/811 |
| 9,621,772 | B2* | 4/2017 | Schmieder .............. | H01L 41/09 |
| 10,606,020 | B2* | 3/2020 | Wei ........................ | G02B 7/022 |
| 2005/0280908 | A1* | 12/2005 | Tanaka ................... | G02B 7/021 |
| | | | | 359/811 |
| 2007/0063136 | A1* | 3/2007 | Chiang .................. | G02B 7/006 |
| | | | | 250/239 |
| 2007/0285555 | A1* | 12/2007 | Chen .................... | H04N 5/2253 |
| | | | | 348/340 |
| 2008/0138060 | A1* | 6/2008 | Chang .................. | G02B 13/001 |
| | | | | 396/529 |
| 2009/0073582 | A1* | 3/2009 | Lee ...................... | G02B 13/001 |
| | | | | 359/819 |
| 2009/0244735 | A1* | 10/2009 | Sasaki .................... | G02B 7/021 |
| | | | | 359/830 |
| 2012/0314288 | A1* | 12/2012 | Lai ..................... | G02B 13/0035 |
| | | | | 359/503 |
| 2013/0077183 | A1* | 3/2013 | An ......................... | G02B 7/022 |
| | | | | 359/819 |
| 2015/0002726 | A1* | 1/2015 | Schmieder ............... | G02B 7/08 |
| | | | | 348/357 |
| 2016/0291281 | A1* | 10/2016 | Lamontagne .......... | G02B 7/026 |

FOREIGN PATENT DOCUMENTS

| | | |
|---|---|---|
| JP | 1982202508 A1 | 12/1982 |
| JP | 1986105519 A1 | 5/1986 |
| JP | 1986167611 A1 | 10/1986 |
| JP | 1999326732 A1 | 11/1999 |

* cited by examiner

LENS MODULE

TECHNICAL FIELD

The present disclosure relates to a lens module and, in particular, to a sectional lens module structure.

BACKGROUND

With the development of technologies, the electronic devices have been developed to be smarter, in addition to digital cameras, portable electronic devices such as tablet PC and cellphone have been provided with a lens module.

The lens module in the prior art includes a lens barrel, a lens group arranged in the lens barrel, a light shading sheet or light shading plate clamped between two adjacent lenses and a stopper arranged between the bottommost lens and the lens barrel. In the related art, the lens barrel is inject molded as an integrated structure, each lens is installed from the bottom of the lens barrel and fixed in the lens barrel. However, the above assembling manner is too simple.

Therefore, there is a necessity to provide a new lens module so as to solve the above problem.

BRIEF DESCRIPTION OF DRAWINGS

Many aspects of the exemplary embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DESCRIPTION OF EMBODIMENTS

The present disclosure will be further illustrated with reference to the accompanying drawings and the embodiments.

Embodiment 1

Figure 1:
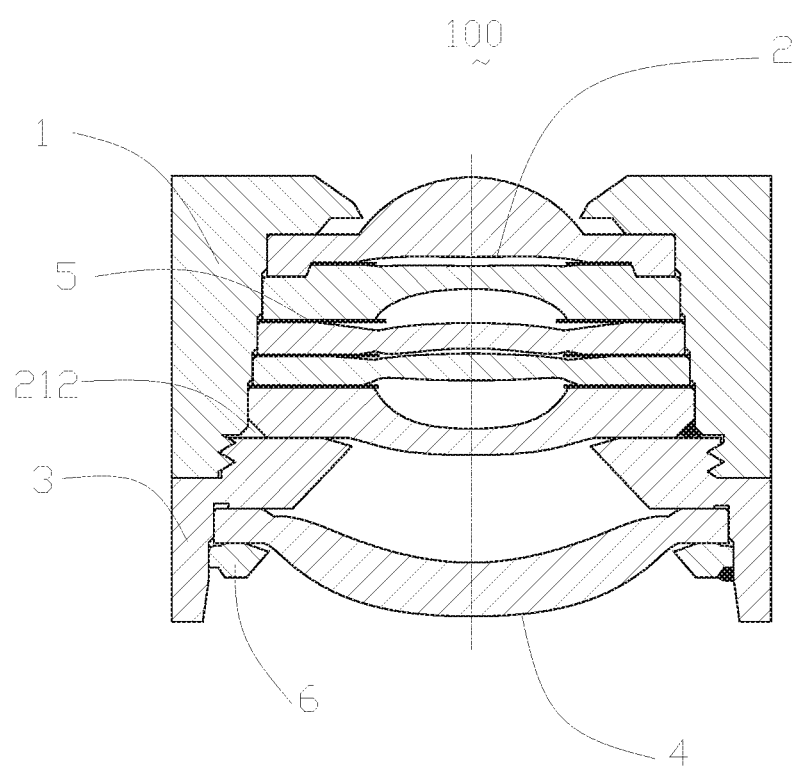
FIG. 1 is a structural schematic view of a lens module in accordance with Embodiment 1 of the present disclosure.

Please refer to FIG. 1, the lens module 100 includes a lens barrel 1, a first lens group 2 having at least one lens and accommodated in the lens barrel 1, a spacer provided at an end of the lens barrel 1 close to an image side, a second lens group 4 having at least one lens and accommodated in the spacer 3, a light shading sheet 5 arranged in the lens barrel 1 and/or the spacer 3, and a stopper 6 configured to fix the second lens group 4.

Figure 2:
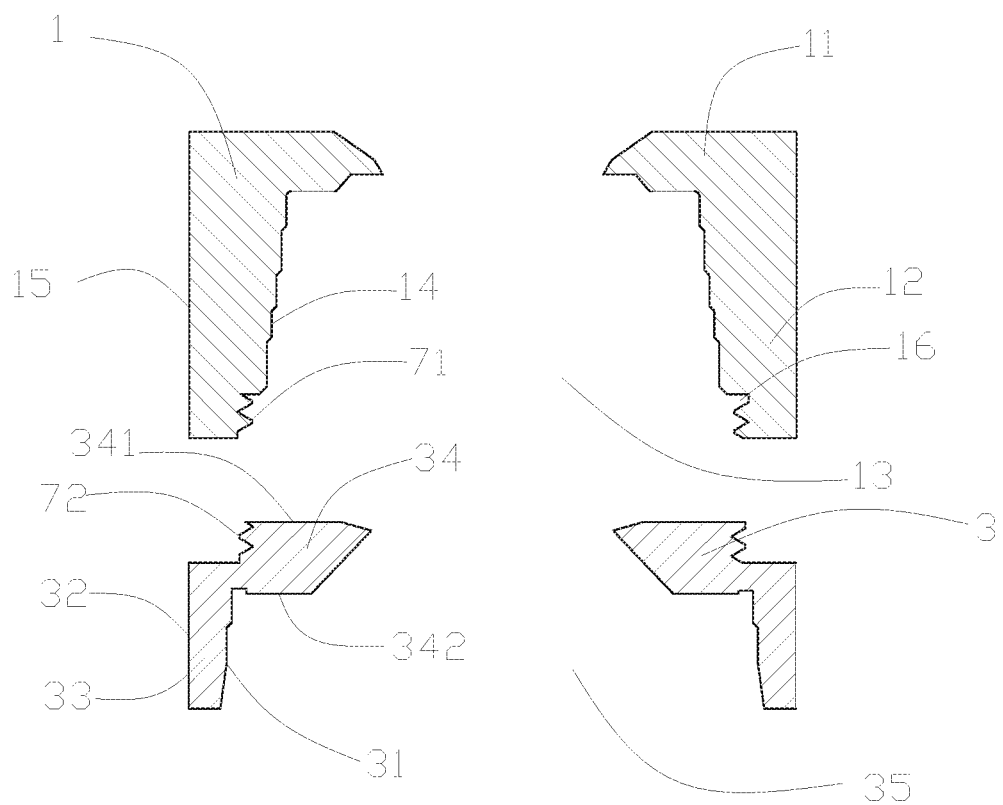
FIG. 2 is a schematic view of a lens barrel and a spacer in a lens module in accordance with Embodiment 1 of the present disclosure.
Figure 3:
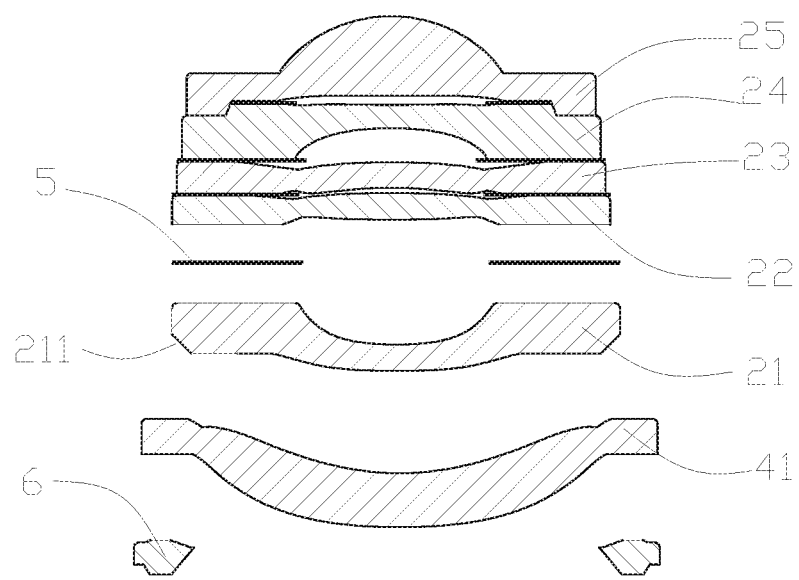
FIG. 3 is a schematic view of partial components in a lens module in accordance with Embodiment 1 of the present disclosure.

Please refer to FIG. 2 and FIG. 3, the lens barrel 1 includes a first barrel wall 11 extending along a horizontal direction to form a light aperture, a second barrel wall 12 bending and extending from the first barrel wall 11, and receiving space 13 formed by surrounding of the first barrel wall 11 and the second barrel wall 12, the first lens group 2 is received in the receiving space 13, the lens barrel 1 further includes a first inner wall 14 and a first outer wall 15 corresponding to the first inner wall 14. The lens barrel 1 is sunken from its bottom towards an object side direction to form a receiving groove 16.

The first lens group 2 includes a first lens 21, a second lens 22 coaxially arranged with respect to the first lens 21, a third lens 23, a fourth lens 24 and a fifth lens 25 which are successively arranged by stacking from the image side to the object side. In the present embodiment, the first lens group 2 includes five lenses, which can also include only one lens or other numbers of lenses according to actual demands. In the first lens group 2, a light shading sheet 5 is provided between any adjacent lenses, or a light shading piece or light shading plate can be provided between corresponding lenses according to actual demands. A position of an image side surface of the first lens 21 close to the lens barrel 1 is provided with a concave portion 211, the concave portion 211 and the first inner wall 14 of the lens barrel 1 form an adhesive accommodating groove 212 for accommodating adhesive.

Please refer to FIGS. 1-3, the spacer 3 includes a second inner wall 31 and a second outer wall 32 corresponding to the second inner wall 31, the spacer 3 includes a main portion 33 and an extending portion 34 formed by extending from the main portion 33 towards an optical axis direction, the main portion 33 and the extending portion 34 surround accommodating space 35 for accommodating the second lens group 4, the first outer wall 15 of the second barrel wall 12 of the lens barrel 1 is level with the second outer wall 32 of the main portion 33 of the spacer 3. The extending portion 34 includes a first surface 341 close to the object side and a second surface 342 far away from the object side, the extending portion 34 is of a ring structure, the first surface 341 of the extending portion 34 abuts with the bottom of the first lens group 2, that is, abuts with an image side surface of the first lens 21.

The second lens group 4 includes a sixth lens 41. In the present embodiment, the second lens group 4 includes only one lens, other numbers of lenses may be alternatively provided according to actual demands. In the second lens group 4, a light shading piece or light shading plate can be provided at the object side or image side of any lens. The second surface 342 of the extending portion 34 abuts with the top of the second lens group 4, that is, abuts with an object side surface of the sixth lens 41.

The lens barrel 1 is fixed with the spacer 3 via a thread fitting portion 7, the thread fitting portion 7 includes a first thread 71 provided on the first inner wall 14 of the lens barrel 1, and a second thread 72 provided on the second outer wall 32 of the spacer 3, the second thread 72 is provided on the extending portion 34 of the spacer 3, the first thread 71 is provided in the receiving groove 16.

Figure 4:
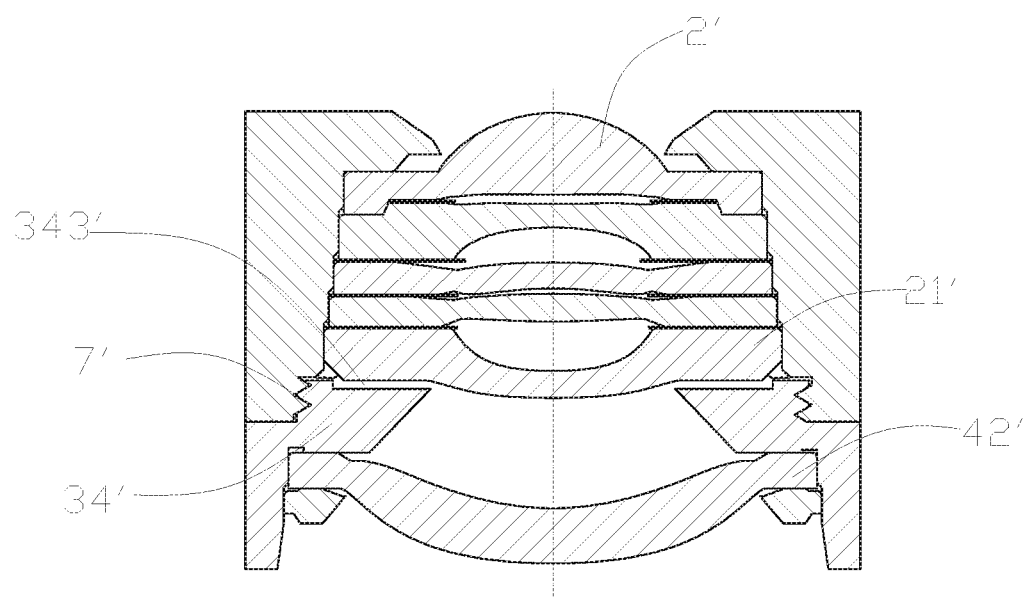
FIG. 4 is a structural schematic view of a lens module in accordance with an alternative implementing manner of Embodiment 1 of the present disclosure.

As shown in FIG. 4, in another implementing manner of Embodiment 1, the extending portion 34' is sunken from its first surface 341' towards the image side direction to form a groove 343', the first lens group 2' is provided above the groove 343' and is spaced from the extending portion 34'. As such, through tightening the thread fitting structure 7', an air gap can be adjusted between the first lens 21' and the sixth lens 41'.

When assembling the lens module 100, the lens barrel 1, the first lens group 2 and the light shading sheet 5 are firstly provided, the first lens group 2 is successively installed in the receiving space 13 of the lens barrel 1 from the image side of the lens barrel 1, the light shading sheet 5 can be provided between adjacent lenses, any number of light shading sheet 5 or light shading plate can be provided according to actual demands, then glue dispensing in the adhesive accommodating groove 212 at the image side of the first lens 21 so as to fix the first lens group 2; providing the spacer 3, the second lens group 4 and the stopper 6, the lenses in the second lens group 4 is successively installed in the accommodating space 35 of the spacer 3, any number of the light shading sheet and/or light shading plate can be provided between any adjacent two lenses, the object side surface of the sixth lens 41 is fitted with the second surface 342 of the extending portion 34, an edge of each lens in the first lens group 2 and the second lens group 4 is interference fitted with the first inner wall 14 of the second barrel wall 12 of the lens barrel 1 or with the second inner wall 31 of the main portion 33 of the spacer 3, or through non-pressure fitting, but interference fitting is preferred. As such, the coaxial extent of the lens group can be further guaranteed, so that the lens group can be accurately pressed into the lens barrel 1 or the spacer 3, so as to achieve fixing effect. The stopper 6 is provided at the image side surface of the sixth lens 41, and is fixed by a glue dispensing process, and finally the lens barrel 1 is fixed with the spacer 3 via the thread fitting portion 7. So far, the lens module 1 is completely assembled.

Comparing with the lens module in the related art, the lens module provided by Embodiment 1 can have the following advantages:

Sectional assembling is available, the lens barrel is fixed with the spacer through a thread fitting structure, the assembling process is convenient, if the lenses are mis-assembled, correction can be timely made, the structure is simple, and the thread fitting makes the integral module structure more stable.

Embodiment 2

Figure 5:
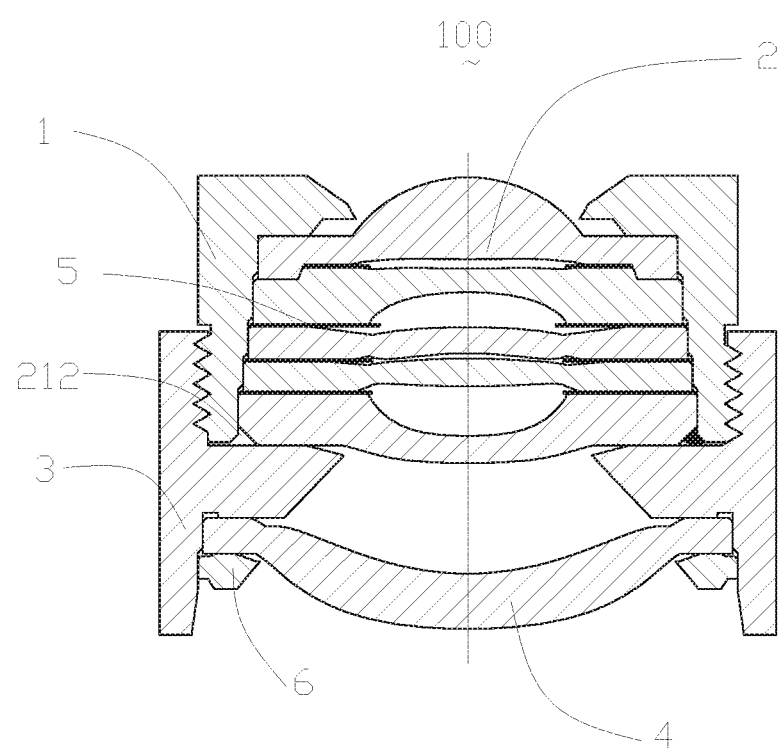
FIG. 5 is a structural schematic view of a lens module in accordance with Embodiment 2 of the present disclosure.

Please refer to FIG. 5, the lens module 100 includes a lens barrel 1, a first lens group 2 having at least one lens and accommodated in the lens barrel 1, a spacer 3 provided at an end of the lens barrel 1 close to an image side, a second lens group 4 having at least one lens and accommodated in the spacer 3, a light shading sheet 5 arranged in the lens barrel 1 and/or the spacer 3, and a stopper 6 configured to fix the second lens group 4.

Figure 6:
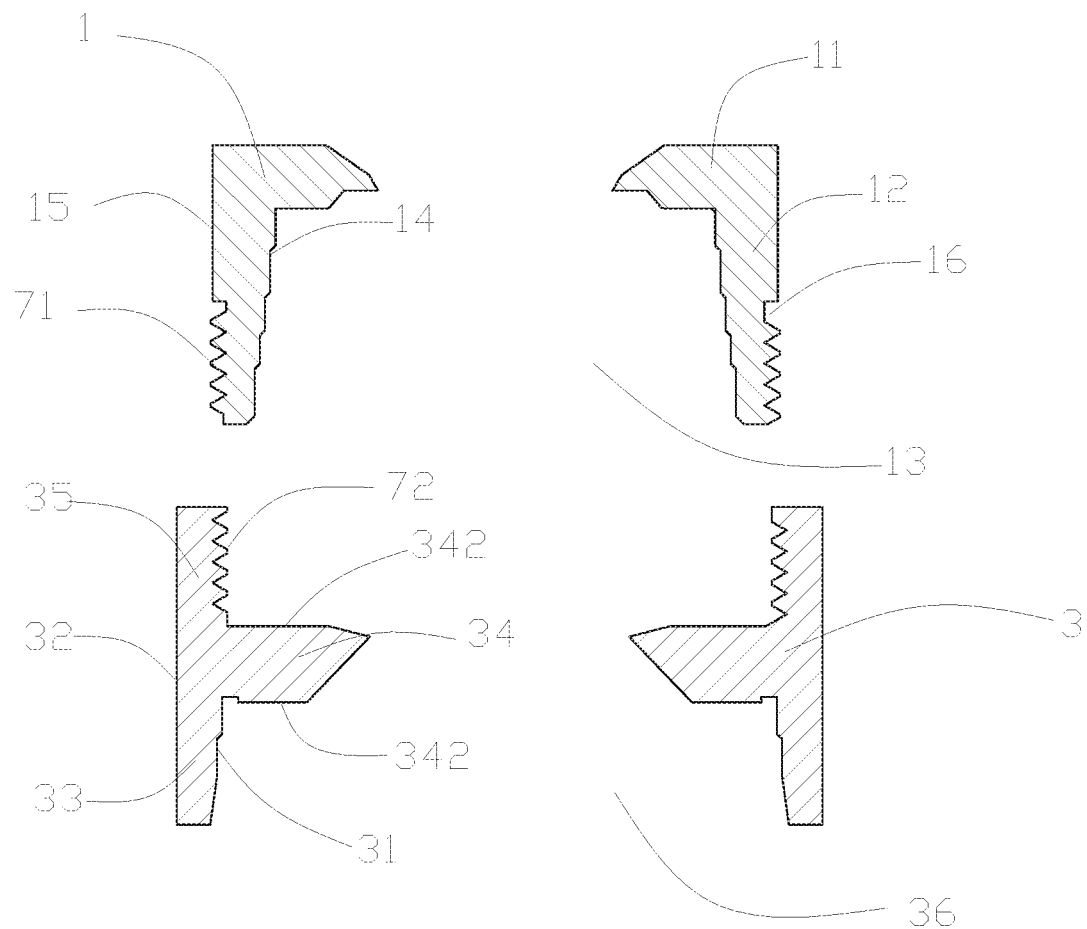
FIG. 6 is a schematic view of a lens barrel and a spacer in a lens module in accordance with Embodiment 2 of the present disclosure.
Figure 7:
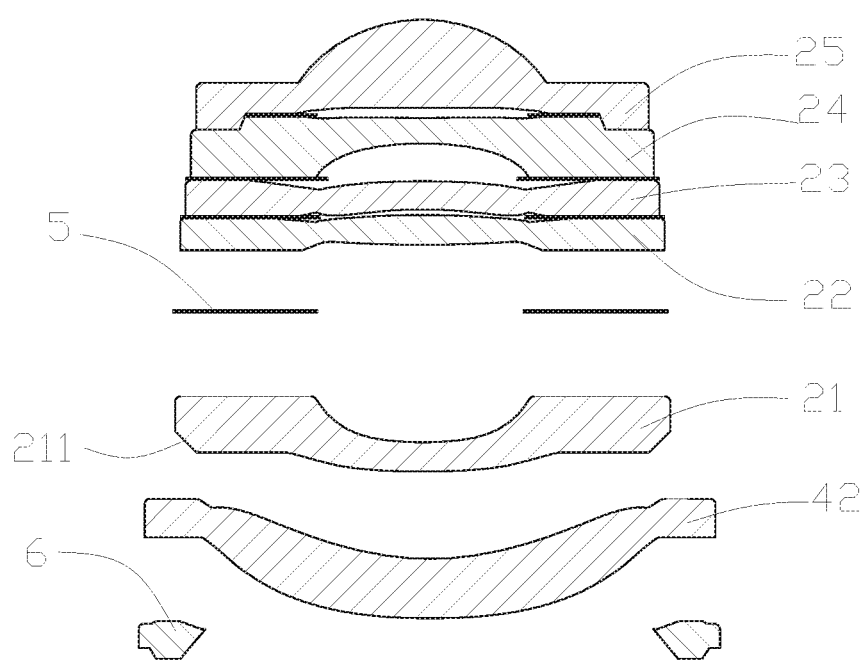
FIG. 7 is a schematic view of partial components in a lens module in accordance with Embodiment 2 of the present disclosure.

Please refer to FIG. 6 and FIG. 7, the lens barrel 1 includes a first barrel wall 11 extending along a horizontal direction to form a light aperture, a second barrel wall 12 bending and extending from the first barrel wall 11, and receiving space 13 formed by surrounding of the first barrel wall 11 and the second barrel wall 12, the first lens group 2 is received in the receiving space 13, the lens barrel 1 further includes a first inner wall 14 and a first outer wall 15 corresponding to the first inner wall 14. The lens barrel 1 is sunken from its end towards the object side direction to form a receiving groove 16.

The first lens group 2 includes a first lens 21, a second lens 22 coaxially arranged with respect to the first lens 21, a third lens 23, a fourth lens 24 and a fifth lens 25 which are successively arranged by stacking from the image side to the object side. In the present embodiment, the first lens group 2 includes five lenses, which can also include only one lens or other numbers of lenses according to actual demands. In the first lens group 2, a light shading sheet 5 is provided between any adjacent lenses, or a light shading piece or light shading plate can be provided between corresponding lenses according to actual demands. A position of an image side surface of the first lens 21 close to the lens barrel 1 is provided with a concave portion 211, the concave portion 211 and the first inner wall 14 of the lens barrel 1 form an adhesive accommodating groove 212 for accommodating adhesive.

Please refer to FIGS. 5-7, the spacer 3 includes a second inner wall 31 and a second outer wall 32 corresponding to the second inner wall 31, the spacer 3 includes a main portion 33, an extending portion 34 formed by extending from the main portion 33 towards an optical axis direction, and a convex portion 35 formed by extending from the extending portion towards the object side direction, the main portion 33 and the extending portion 34 surround to form accommodating space 36. The extending portion 34 includes a first surface 341 close to the object side and a second surface 342 far away from the object side, the extending portion 34 is of a ring structure, the first surface 341 of the extending portion 34 abuts with the bottom of the first lens group 2, that is, abuts with an image side surface of the first lens 21.

The second lens group 4 includes a sixth lens 41. In the present embodiment, the second lens group 4 includes only one lens, other numbers of lenses may be alternatively provided according to actual demands. In the second lens group 4, a light shading piece or light shading plate can be provided at the object side or the image side of any lens. The second surface 342 of the extending portion 34 abuts with the top of the second lens group 4, that is, abuts with an object side surface of the sixth lens 41.

The lens barrel 1 is fixed with the spacer 3 via a thread fitting portion 7, the thread fitting portion 7 includes a first thread 71 provided on the first outer wall 15 of the lens barrel 1, and a second thread 72 provided on the second inner wall 31 of the spacer 3, the second thread 72 is provided on the convex portion 35 of the spacer 3, the first thread 71 is provided in the receiving groove 16.

Figure 8:
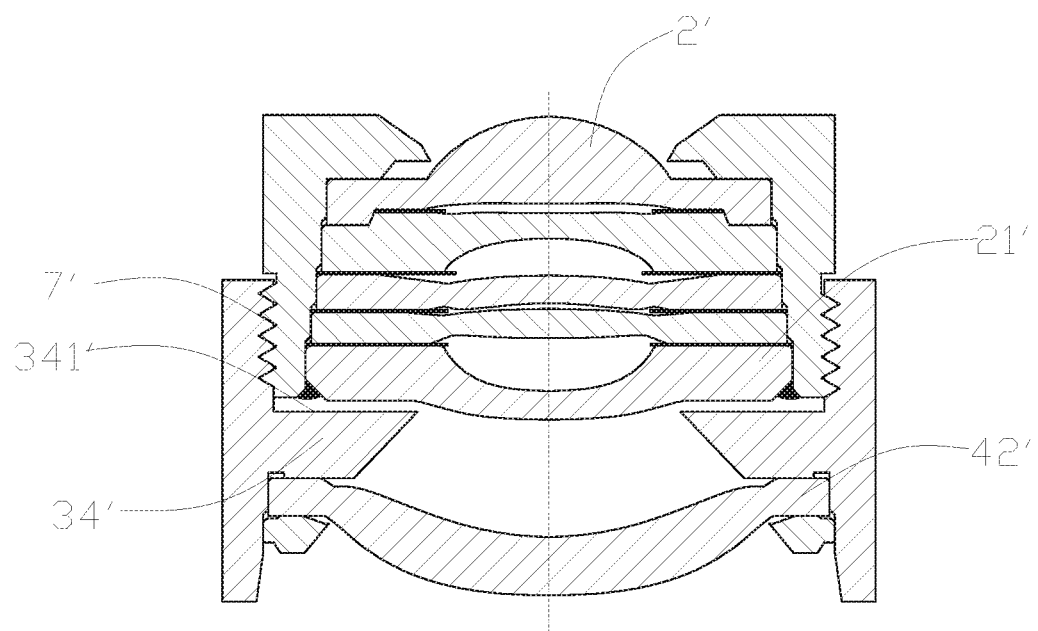
FIG. 8 is a structural schematic view of a lens module in accordance with an alternative implementing manner of Embodiment 2 of the present disclosure.

As shown in FIG. 8, in another implementing manner of Embodiment 2, the first lens group 2' is provided above the first surface 341' and is spaced from the extending portion 34'. As such, through tightening the thread fitting structure 7', an air gap can be adjusted between the first lens 21' and the sixth lens 41'.

When assembling the lens module 100, the lens barrel 1, the first lens group 2 and the light shading sheet 5 are firstly provided, the first lens group 2 is successively installed in the receiving space 13 of the lens barrel 1 from the image side of the lens barrel 1, the light shading sheet 5 can be provided between adjacent lenses, any number of light shading sheet 5 or light shading plate can be provided according to actual demands, then glue dispensing in adhesive accommodating groove 212 at the image side of the first lens 21 so as to fix the first lens group 2; providing the spacer 3, the second lens group 4 and the stopper 6, the lenses in the second lens group 4 is successively installed in the accommodating space 36 of the spacer 3, any number of the light shading sheet or light shading plate can be provided between any adjacent two lenses, the object side surface of the sixth lens 41 is fitted with the second surface 342 of the extending portion 34, an edge of each lens in the first lens group 2 and the second lens group 4 is interference fitted with the first inner wall 14 of the second barrel wall 12 of the lens barrel 1 or with the second inner wall 31 of the main portion 33 of the spacer 3, or through non-pressure fitting, but interference fitting is preferred. As such, the coaxial extent of the lens group can be further guaranteed, so that the lens group can be accurately pressed into the lens barrel 1 or the spacer 3, so as to achieve fixing effect. The stopper 6 is provided at the image side surface of the sixth lens 41, and is fixed by a glue dispensing process, and finally the lens barrel 1 is fixed with the spacer 3 via the thread fitting portion 7. So far, the lens module 1 is completely assembled.

Comparing with the lens module in the related art, the lens module provided by Embodiment 2 can have the following advantages:

Sectional assembling is available, the lens barrel is fixed with the spacer through a thread fitting structure, the assembling process is convenient, if the lenses are mis-assembled, correction can be timely made, the structure is simple, and the thread fitting makes the integral module structure more stable.

Embodiment 3

Figure 9:
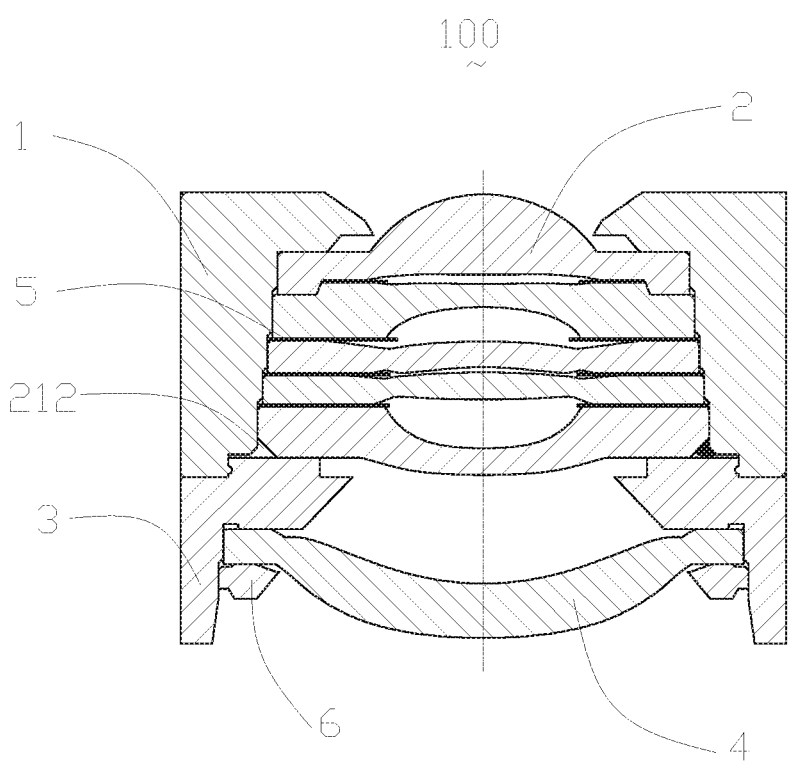
FIG. 9 is a structural schematic view of a lens module in accordance with Embodiment 3 of the present disclosure.

Please refer to FIG. 9, the lens module 100 includes a lens barrel 1, a first lens group 2 having at least one lens and accommodated in the lens barrel 1, a spacer 3 provided at an end of the lens barrel 1 close to an image side, a second lens group 4 having at least one lens and accommodated in the spacer 3, a light shading sheet 5 arranged in the lens barrel 1 and/or the spacer 3, and a stopper 6 configured to fix the second lens group 4.

Figure 10:
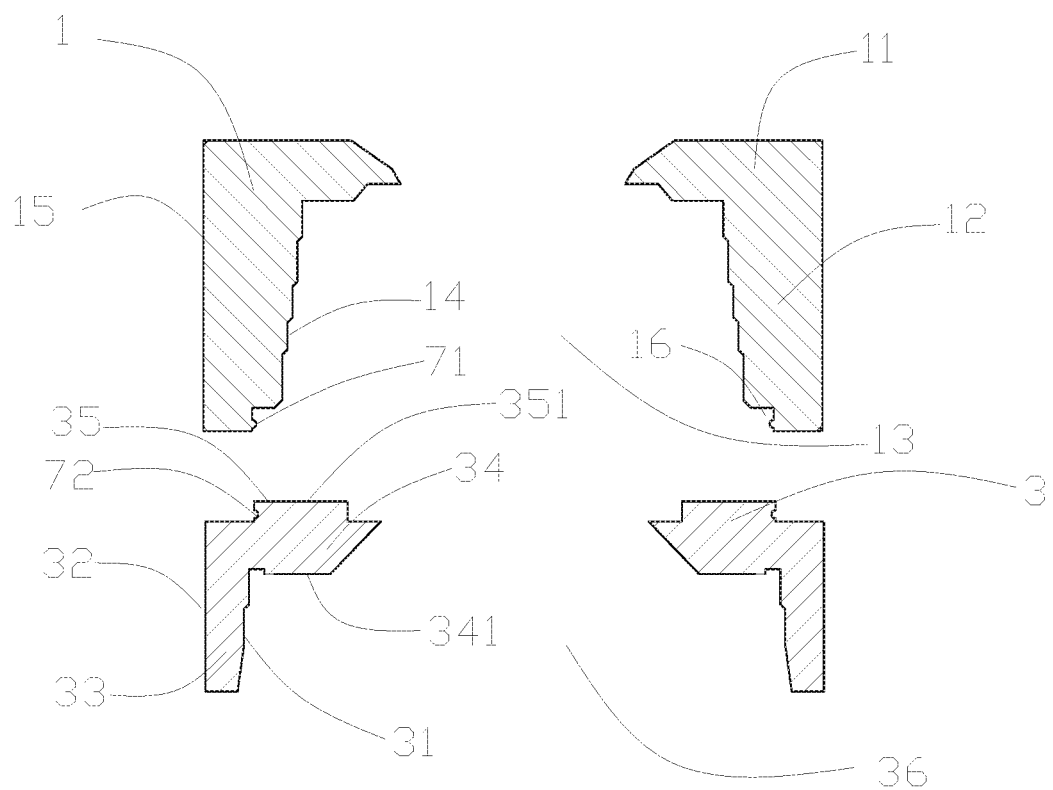
FIG. 10 is a schematic view of a lens barrel and a spacer in a lens module in accordance with Embodiment 3 of the present disclosure.
Figure 11:
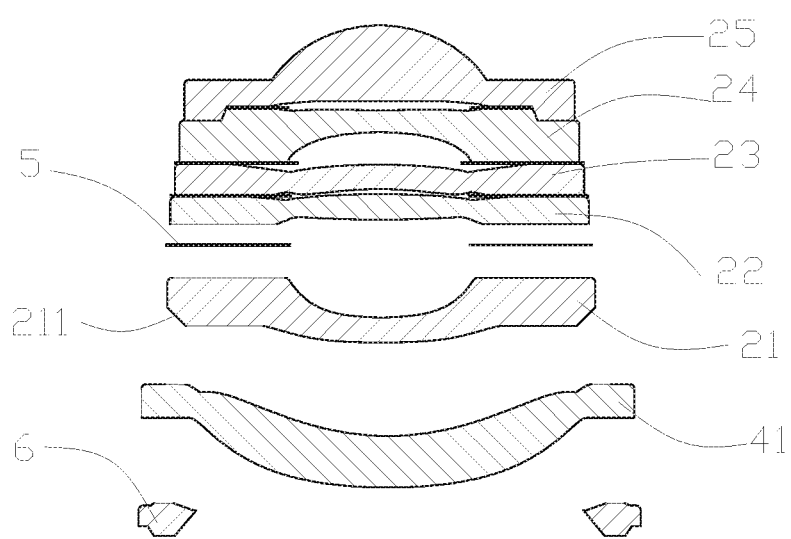
FIG. 11 is a schematic view of partial components in a lens module in accordance with Embodiment 3 of the present disclosure.

Please refer to FIG. 10 and FIG. 11, the lens barrel 1 includes a first barrel wall 11 extending along a horizontal direction to form a light aperture, a second barrel wall 12 bending and extending from the first barrel wall 11, and receiving space 13 formed by surrounding of the first barrel wall 11 and the second barrel wall 12, the first lens group 2 is received in the receiving space 13, the lens barrel 1 further includes a first inner wall 14 and a first outer wall 15 corresponding to the first inner wall 14. The lens barrel 1 is sunken from its bottom towards an object side direction to form a receiving groove 16.

The first lens group 2 includes a first lens 21, a second lens 22 coaxially arranged with respect to the first lens 21, a third lens 23, a fourth lens 24 and a fifth lens 25 which are successively arranged by stacking from the image side to the object side. In the present embodiment, the first lens group 2 includes five lenses, which can also include only one lens or other numbers of lenses according to actual demands. In the first lens group 2, a light shading sheet 5 is provided between any adjacent lenses, or a light shading piece or light shading plate can be provided between corresponding lenses according to actual demands. A position of an image side surface of the first lens 21 close to the lens barrel 1 is provided with a concave portion 211, the concave portion 211 and the first inner wall 14 of the lens barrel 1 form an adhesive accommodating groove 212 for accommodating adhesive.

Please refer to FIGS. 9-11, the spacer 3 includes a second inner wall 31 and a second outer wall 32 corresponding to the second inner wall 31, the spacer 3 includes a main portion 33, an extending portion 34 formed by extending from the main portion 33 towards an optical axis direction, and a convex portion 35 formed by extending from the extending portion 34 towards the object side direction, the main portion 33 and the extending portion 34 surround to form accommodating space 36 for accommodating the second lens group 4, the first outer wall 15 of the second barrel wall 12 of the lens barrel 1 is level with the second outer wall 32 of the main portion 33 of the spacer 3. The convex portion 35 includes a first surface 351 close to the object side, the extending portion 34 includes a second surface 341 close to the object side, the extending portion 34 is of a ring structure, the first surface 351 of the convex portion 35 abuts with the bottom of the first lens group 2, that is, abuts with an image side surface of the first lens 21.

The second lens group 4 includes a sixth lens 41. In the present embodiment, the second lens group 4 includes only one lens, other numbers of lenses may be alternatively provided according to actual demands. In the second lens group 4, a light shading piece or light shading plate can be provided at the object side or image side of any lens. The second surface 341 of the extending portion 34 abuts with the top of the second lens group 4, that is, abuts with an object side surface of the sixth lens 41.

The lens barrel 1 is fixed with the spacer 3 via a clamp fitting portion 7, the clamp fitting portion 7 includes a first clamping portion 71 provided on the first inner wall 14 of the lens barrel 1, and a second clamping portion 72 provided on the second outer wall 32 of the spacer 3, the second clamping portion 72 is provided on the convex portion 35 of the spacer 3, the first clamping portion 71 is provided in the receiving groove 16. The first surface 351 of the convex portion 35 abuts with the bottom of the first lens group 2. The first clamping portion 71 is a structure formed by protruding towards the optical axis direction, the second clamping portion 72 is a structure formed by sinking towards the optical axis direction. Surfaces of the first clamping portion 71 and the second clamping portion 72 are both of an arc shape, so as to facilitate clamping.

Figure 12:
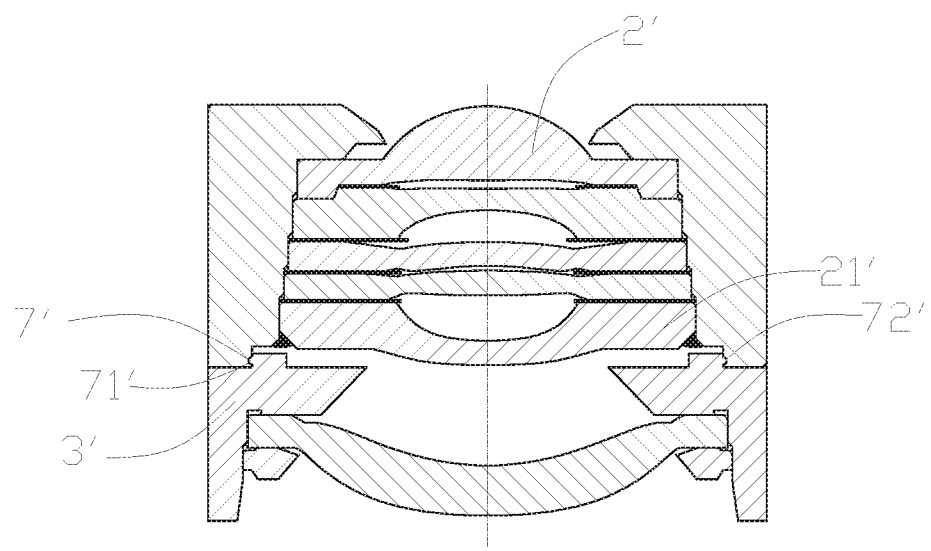
FIG. 12 is a structural schematic view of a lens module in accordance with an alternative implementing manner of Embodiment 3 of the present disclosure.

As shown in FIG. 12, in another implementing manner of Embodiment 3, the first clamping portion 71' is a structure formed by sinking towards an opposite direction of the optical axis direction, the second clamping portion 72' is a structure formed by protruding towards an opposite direction of the optical axis direction. Surfaces of the first clamping portion 71' and the second clamping portion 72' are both of an arc shape, so as to facilitate clamping. An upper end of the spacer 3' is spaced from the first lens group 2', that is, the upper end of the spacer 3' is spaced from the first lens 21'.

When assembling the lens module 100, the lens barrel 1, the first lens group 2 and the light shading sheet 5 are firstly provided, the first lens group 2 is successively installed in the receiving space 13 of the lens barrel 1 from the image side of the lens barrel 1, the light shading sheet 5 can be provided between adjacent lenses, any number of light shading sheet 5 or light shading plate can be provided according to actual demands, then glue dispensing in adhesive accommodating groove 212 at the image side of the first lens 21 so as to fix the first lens group 2; providing the spacer 3, the second lens group 4 and the stopper 6, the lenses in the second lens group 4 is successively installed in the accommodating space 36 of the spacer 3, any number of the light shading sheet or light shading plate can be provided between any adjacent two lenses, the object side surface of the sixth lens 41 is fitted with the second surface 342 of the extending portion 34, an edge of each lens in the first lens group 2 and the second lens group 4 is interference fitted with the first inner wall 14 of the second barrel wall 12 of the lens barrel 1 or with the second inner wall 31 of the main portion 33 of the spacer 3, or through non-pressure fitting, but interference fitting is preferred. As such, the coaxial extent of the lens group can be further guaranteed, so that the lens group can be accurately pressed into the lens barrel 1 or the spacer 3, so as to achieve fixing effect. The stopper 6 is provided at the image side surface of the sixth lens 41, and is fixed by a glue dispensing process, and finally the lens barrel 1 is fixed with the spacer 3 via the clamp fitting portion 7. So far, the lens module 1 is completely assembled.

Comparing with the lens module in the related art, the lens module provided by Embodiment 3 can have the following advantages:

Sectional assembling is available, the lens barrel is fixed with the spacer through a clamp fitting structure, the assembling process is convenient, if the lenses are mis-assembled, correction can be timely made, the structure is simple, and the clamp fitting makes the integral module structure more stable.

Embodiment 4

Figure 13:
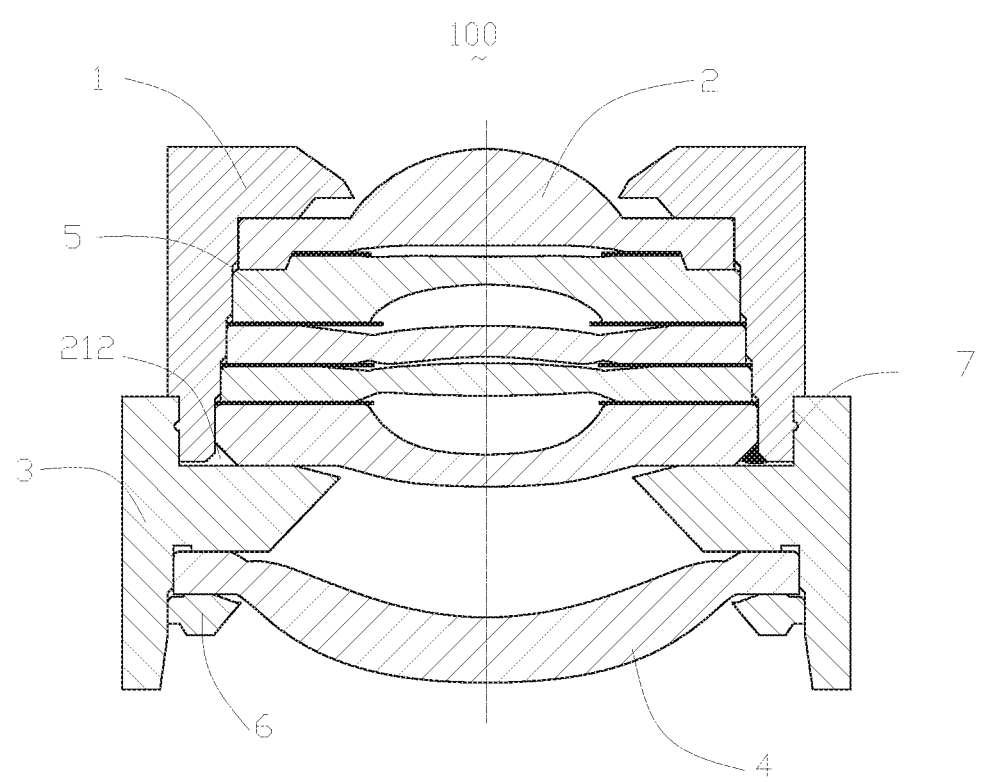
FIG. 13 is a structural schematic view of a lens module in accordance with Embodiment 4 of the present disclosure.

Please refer to FIG. 13, the lens module 100 includes a lens barrel 1, a first lens group 2 having at least one lens and accommodated in the lens barrel 1, a spacer provided at an end of the lens barrel 1 close to an image side, a second lens group 4 having at least one lens and accommodated in the spacer 3, a light shading sheet 5 arranged in the lens barrel 1 and/or the spacer 3, and a stopper 6 configured to fix the second lens group 4.

Figure 14:
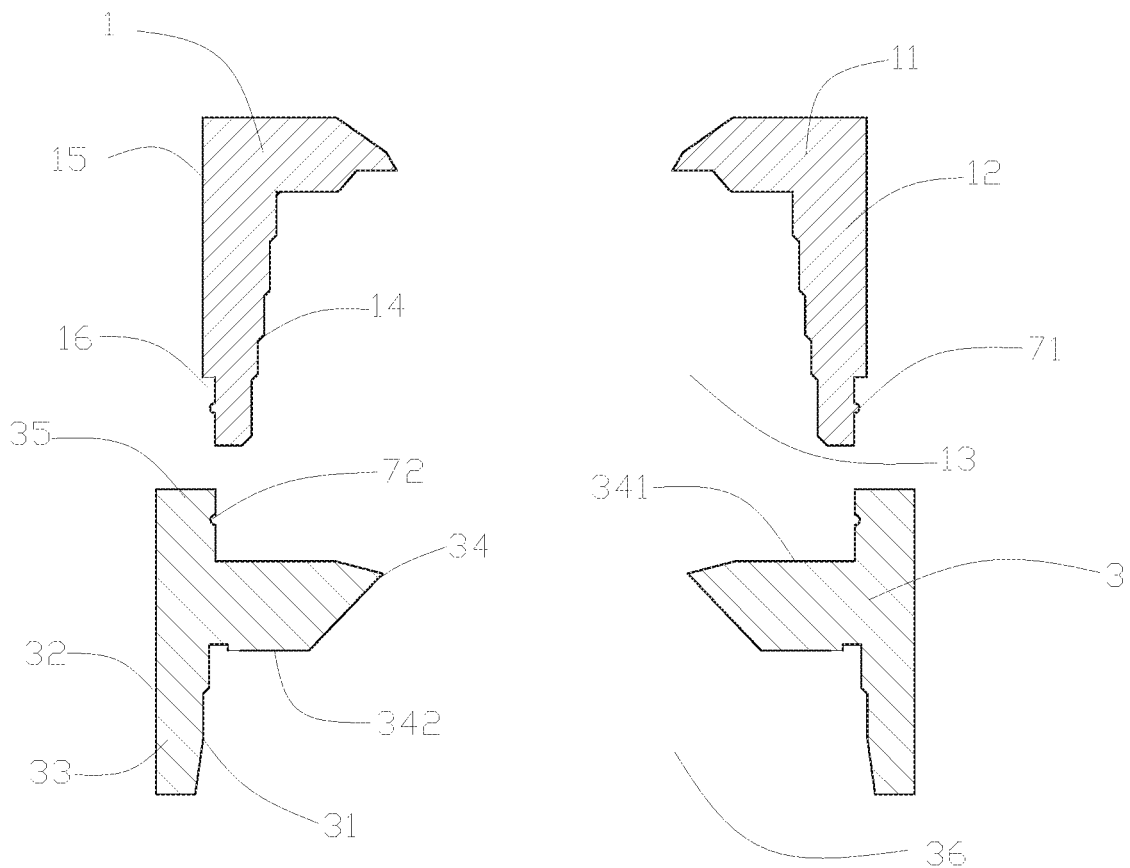
FIG. 14 is a schematic view of a lens barrel and a spacer in a lens module in accordance with Embodiment 4 of the present disclosure.
Figure 15:
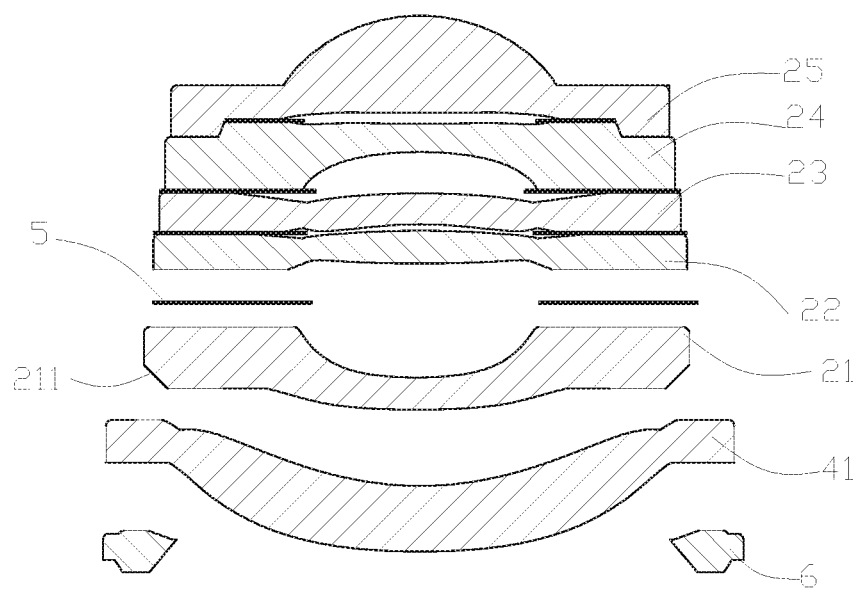
FIG. 15 is a schematic view of partial components in a lens module in accordance with Embodiment 4 of the present disclosure.

Please refer to FIG. 14 and FIG. 15, the lens barrel 1 includes a first barrel wall 11 extending along a horizontal direction to form a light aperture, a second barrel wall 12 bending and extending from the first barrel wall 11, and receiving space 13 formed by surrounding of the first barrel wall 11 and the second barrel wall 12, the first lens group 2 is received in the receiving space 13, the lens barrel 1 further includes a first inner wall 14 and a first outer wall 15 corresponding to the first inner wall 14. The lens barrel 1 is sunken from its bottom towards an object side direction to form a receiving groove 16.

The first lens group 2 includes a first lens 21, a second lens 22 coaxially arranged with respect to the first lens 21, a third lens 23, a fourth lens 24 and a fifth lens 25 which are successively arranged by stacking from the image side to the object side. In the present embodiment, the first lens group 2 includes five lenses, which can also include only one lens or other numbers of lenses according to actual demands. In the first lens group 2, a light shading sheet 5 is provided between any adjacent lenses, or a light shading piece or light shading plate can be provided between corresponding lenses according to actual demands. A position of an image side surface of the first lens 21 close to the lens barrel 1 is provided with a concave portion 211, the concave portion 211 and the first inner wall 14 of the lens barrel 1 form an adhesive accommodating groove 212 for accommodating adhesive.

Please refer to FIGS. 13-15, the spacer 3 includes a second inner wall 31 and a second outer wall 32 corresponding to the second inner wall 31, the spacer 3 includes a main portion 33, an extending portion 34 formed by extending from the main portion 33 towards an optical axis direction, and a convex portion 35 formed by extending from the main portion 33 towards the object side direction, the main portion 33 and the extending portion 34 surround to form accommodating space 36 for accommodating the second lens group 4. The extending portion 34 includes a first surface 341 close to the object side and a second surface 342 far away from the object side, the extending portion 34 is of a ring structure, the first surface 341 of the extending portion 34 abuts with the bottom of the first lens group 2, that is, abuts with an image side surface of the first lens 21.

The second lens group 4 includes a sixth lens 41. In the present embodiment, the second lens group 4 includes only one lens, other numbers of lenses may be alternatively provided according to actual demands. In the second lens group 4, a light shading piece or light shading plate can be provided at the object side or the image side of any lens. The second surface 342 of the extending portion 34 abuts with the top of the second lens group 4, that is, abuts with an object side surface of the sixth lens 41.

The lens barrel 1 is fixed with the spacer 3 via a clamp fitting portion 7, the clamp fitting portion 7 includes a first clamping portion 71 provided on the first outer wall 15 of the lens barrel 1, and a second clamping portion 72 provided on the second inner wall 31 of the spacer 3, the second clamping portion 72 is provided on the convex portion 35 of the spacer 3, the first clamping portion 71 is provided in the receiving groove 16. The first surface 341 of the extending portion 34 abuts with the bottom of the first lens group 2. The first clamping portion 71 is a structure formed by protruding towards an opposite direction of the optical axis direction, the second clamping portion 72 is a structure formed by sinking towards an opposite direction of the optical axis direction. Surfaces of the first clamping portion 71, the second clamping portion 72 are both of an arc shape, so as to facilitate clamping.

Figure 16:
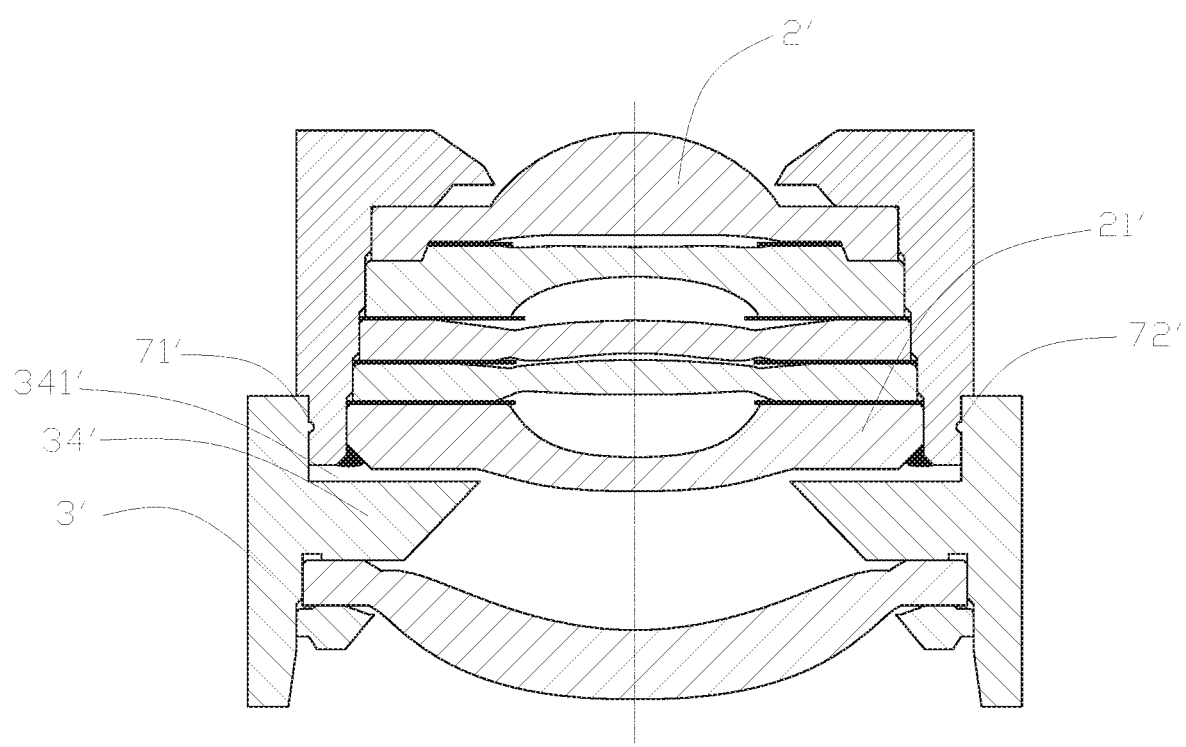
FIG. 16 is a structural schematic view of a lens module in accordance with an alternative implementing manner of Embodiment 4 of the present disclosure.

As shown in FIG. 16, in another implementing manner of Embodiment 4, the first clamping portion 71' is a structure formed by sinking towards the optical axis direction, the second clamping portion 72' is a structure formed by protruding towards the optical axis direction. Surfaces of the first clamping portion 71' and the second clamping portion 72' are both of an arc shape, so as to facilitate clamping. The first surface 341' of the extending portion 34' of the spacer 3' is spaced from the first lens group 2', that is, the first surface 341' of the extending portion 34' is spaced from the first lens 21'.

It should be noted that, shapes of the first clamping portion and the second clamping portion can be exchanged with each other.

When assembling the lens module 100, the lens barrel 1, the first lens group 2 and the light shading sheet 5 are firstly provided, the first lens group 2 is successively installed in the receiving space 13 of the lens barrel 1 from the image side of the lens barrel 1, the light shading sheet 5 can be provided between adjacent lenses, any number of light shading sheet 5 or light shading plate can be provided according to actual demands, then glue dispensing in adhesive accommodating groove 212 at the image side of the first lens 21 so as to fix the first lens group 2; providing the spacer 3, the second lens group 4 and the stopper 6, the lenses in the second lens group 4 is successively installed in the accommodating space 36 of the spacer 3, any number of the light shading sheet or light shading plate can be provided between any adjacent two lenses, the object side surface of the sixth lens 41 is fitted with the second surface 342 of the extending portion 34, an edge of each lens in the first lens group 2 and the second lens group 4 is interference fitted with the first inner wall 14 of the second barrel wall 12 of the lens barrel 1 or with the second inner wall 31 of the main portion 33 of the spacer 3, or through non-pressure fitting, but interference fitting is preferred. As such, the coaxial extent of the lens group can be further guaranteed, so that the lens group can be accurately pressed into the lens barrel 1 or the spacer 3, so as to achieve fixing effect. The stopper 6 is provided at the image side surface of the sixth lens 41, and is fixed by a glue dispensing process, and finally the lens barrel 1 is fixed with the spacer 3 via the clamp fitting portion 7. So far, the lens module 1 is completely assembled.

Comparing with the lens module in the related art, the lens module provided by Embodiment 4 can have the following advantages:

Sectional assembling is available, the lens barrel is fixed with the spacer through a clamp fitting structure, the assembling process is convenient, if the lenses are mis-assembled, correction can be timely made, the structure is simple, and the clamp fitting makes the integral module structure more stable.

It should be noted that, the above are merely exemplary embodiments of the present disclosure, those skilled in the art can make improvements without departing from the inventive concept of the present disclosure, however, these improvements shall belong to the protection scope of the present disclosure.

What is claimed is:

1. A lens module, comprising:
   a lens barrel;
   a first lens group having at least one lens and accommodated in the lens barrel; a spacer provided at an end of the lens barrel close to an image side; and a second lens group having at least one lens and accommodated in the spacer; wherein the lens barrel comprises a first barrel wall which forms a light aperture and a second barrel wall bending and extending from the first barrel wall, the lens barrel further comprises a first inner wall and a first outer wall corresponding to the first inner wall, the spacer comprises a second inner wall and a second outer wall corresponding to the second inner wall, wherein, the lens barrel is fitted and fixed with the spacer via a clamp fitting portion, wherein the clamp fitting portion comprises a first clamping portion provided on the lens barrel and a second clamping portion provided on the spacer, the spacer comprises a main portion, an extending portion formed by extending from the main portion towards an optical axis direction, and a convex portion formed by extending from the extending portion towards an object side direction, the second clamping portion is provided on the convex portion.

2. The lens module as described in claim 1, wherein the first clamping portion provided on the first inner wall of the lens barrel and the second clamping portion provided on the second outer wall of the spacer.

3. The lens module as described in claim 2, wherein a top end of the convex portion abuts with a bottom end of the first lens group.

4. The lens module as described in claim 2, wherein the first lens group is spaced from the spacer.

5. The lens module as described in claim 3, wherein a position of a bottom end of the first lens group close to the lens barrel is provided with a concave portion, the concave portion and the first inner wall of the lens barrel form an adhesive accommodating groove for accommodating adhesive.

6. The lens module as described in claim 2, wherein the first clamping portion is a structure formed by protruding towards the optical axis direction, the second clamping portion is a structure formed by sinking towards the optical axis direction.

7. The lens module as described in claim 2, wherein the first clamping portion is a structure formed by sinking towards an opposite direction of the optical axis direction, the second clamping portion is a structure formed by protruding towards an opposite direction of the optical axis direction.

8. The lens module as described in claim 6, wherein surfaces of the first clamping portion and the second clamping portion are both of an arc shape.

9. The lens module as described in claim 2, wherein the first outer wall of the second barrel wall of the lens barrel is level with the second outer wall of the main portion of the spacer.

10. The lens module as described in claim 2, wherein the lens barrel is sunken from the bottom end thereof towards an object side direction to form a receiving groove, the first clamping portion is provided in the receiving groove.

11. The lens module as described in claim 2, wherein the lens module further comprises a stopper provided at an end of the second lens group close to the image side.

12. A lens module, comprising:
    a lens barrel;
    a first lens group having at least one lens and accommodated in the lens barrel; a spacer provided at an end of the lens barrel close to an image side; and a second lens group having at least one lens and accommodated in the spacer; wherein the lens barrel comprises a first barrel wall which forms a light aperture and a second barrel wall bending and extending from the first barrel wall, the lens barrel further comprises a first inner wall and a first outer wall corresponding to the first inner wall, the spacer comprises a second inner wall and a second outer wall corresponding to the second inner wall, wherein, the lens barrel is fitted and fixed with the spacer via a clamp fitting portion; wherein the clamp fitting portion comprises a first clamping portion provided on the first outer wall of the lens barrel and a second clamping portion provided on the second inner wall of the spacer.

13. The lens module according to claim 12, wherein the spacer comprises a main portion, an extending portion formed by extending from the main portion towards an optical axis direction, and a convex portion formed by extending from the main portion towards the object side direction, the extending portion comprises a first surface close to an object side and a second surface far away from the object side, the second clamping portion is provided on the convex portion.

14. The lens module as described in claim 13, wherein the first surface of the extending portion abuts with a bottom end of the first lens group.

15. The lens module as described in claim 13, wherein the first surface of the extending portion is spaced from the first lens group.

16. The lens module as described in claim 14, wherein a position at a bottom end of the first lens group close to the lens barrel is provided with a concave portion, the concave portion and the first inner wall of the lens barrel form an adhesive accommodating groove for accommodating adhesive.

17. The lens module as described in claim 13, wherein the first clamping portion is a structure formed by protruding towards an opposite direction of the optical axis direction, the second clamping portion is a structure formed by sinking towards an opposite direction of the optical axis direction.

18. The lens module as described in claim 13, wherein the first clamping portion is a structure formed by sinking towards the optical axis direction, the second clamping portion is a structure formed by protruding towards the optical axis direction.

19. The lens module as described in claim 17, wherein surfaces of the first clamping portion and the second clamping portion are both of an arc shape.

20. The lens module as described in claim 12, wherein the lens barrel is sunken from the bottom end thereof towards an object side direction to form a receiving groove, the first clamping portion is provided in the receiving groove.

21. The lens module as described in claim 12, wherein the lens module further comprises a stopper provided at an end of the second lens group close to the image side.

\* \* \* \* \*